United States Patent
Stillig

(10) Patent No.: US 6,872,346 B2
(45) Date of Patent: Mar. 29, 2005

(54) METHOD AND APPARATUS FOR MANUFACTURING FILTERS

(75) Inventor: Martin Stillig, Dransfeld (DE)

(73) Assignee: NxStage Medical, Inc., Lawrence, MA (US)

( * ) Notice: Subject to any disclaimer, the term of this patent is extended or adjusted under 35 U.S.C. 154(b) by 55 days.

(21) Appl. No.: 10/393,295

(22) Filed: Mar. 20, 2003

(65) Prior Publication Data

US 2004/0183228 A1 Sep. 23, 2004

(51) Int. Cl.[7] .......................... B29C 65/18; B29C 65/42; B29C 65/70
(52) U.S. Cl. .................. 264/261; 264/263; 264/266; 264/277; 264/279; 425/508; 425/112; 425/127
(58) Field of Search .................. 264/259, 261, 264/263, 266, 271.1, 275, 277, 279; 425/110, 112, 127, 507, 508

(56) References Cited

U.S. PATENT DOCUMENTS

| | | | | |
|---|---|---|---|---|
| 3,442,002 A | * | 5/1969 | Geary, Jr. et al. | 29/450 |
| 4,138,460 A | * | 2/1979 | Tigner | 264/159 |
| 4,190,411 A | * | 2/1980 | Fujimoto | 425/434 |
| 4,227,295 A | * | 10/1980 | Bodnar et al. | 29/527.3 |
| 4,389,363 A | * | 6/1983 | Molthop | 264/135 |
| 4,414,172 A | * | 11/1983 | Leason | 264/255 |
| 4,689,191 A | * | 8/1987 | Beck et al. | 264/573 |
| 4,869,277 A | * | 9/1989 | Olsen | 15/167.1 |
| 4,954,152 A | * | 9/1990 | Hsu et al. | 65/392 |
| 4,956,089 A | * | 9/1990 | Hurst | 210/484 |
| 5,160,673 A | * | 11/1992 | Wollbeck et al. | 264/45.1 |
| 5,192,478 A | * | 3/1993 | Caskey | 264/139 |
| 5,240,540 A | * | 8/1993 | Matsumoto et al. | 156/252 |
| 5,422,057 A | * | 6/1995 | Karbachsch et al. | 264/257 |
| 5,556,591 A | * | 9/1996 | Jallerat et al. | 264/516 |
| 5,688,460 A | * | 11/1997 | Ruschke | 264/263 |
| 5,871,645 A | * | 2/1999 | Reed et al. | 210/493.2 |
| 6,113,782 A | * | 9/2000 | Leonard | 210/321.89 |
| 6,372,163 B1 | * | 4/2002 | Boucherie | 264/68 |

* cited by examiner

Primary Examiner—Angela Ortiz
(74) Attorney, Agent, or Firm—Proskauer Rose LLP

(57) ABSTRACT

A problem in the manufacture of filters using tubular membrane bundles is keeping potting material from flowing into the openings at the ends of the tubes. A preferred embodiment of a method for manufacturing a tubular membrane filter employs a non-contact heat source such as radiant heating to melt the tips of the tubular membranes. This prevents the migration of potting material into the tubes when the potting material is flowed into the ends of tube bundles during the manufacturing process for a filter.

30 Claims, 4 Drawing Sheets

METHOD AND APPARATUS FOR MANUFACTURING FILTERS

FIELD OF THE INVENTION

The present invention relates generally to devices and methods making filters, particularly for the stage of making tubular fiber filters in which the ends of filter fibers are potted in liquid which is later hardened and cut to form a headers at each end of a fiber bundle.

BACKGROUND OF THE INVENTION

Dialysis, hemofiltration, and other blood treatments that make use of microtubular filters have prolonged the lives of patients with acute or chronic renal insufficiency. In hemodialysis, for example, a semi-permeable membrane or filter is used to remove unwanted substances from the blood while adding desirable components by the process of diffusion across the filter. In Hemofiltration, electrolyte is drawn through a microporous membrane filter and replaced with properly balanced fluid. The principal dialyzer used in the United States is the hollow fiber or capillary dialyzer. In the hollow fiber or capillary dialyzer, membrane material is spun into fine capillaries and thousands of these capillaries are packed into bundles that are used in the filters for filtration. In such filters, blood flows through the capillaries while dialysate is circulated on the outside of the fiber bundle or electrolyte is directly drawn from the blood and replaced by replacement fluid.

Membranes or filters are used in may blood processes including hemofiltration and hemodialysis. Such treatments include: hemodiafiltration, apherisis, hemoconcentration, and hemo-ultrafiltration. One of the limitations on the capabilities of these systems is cost. The process of manufacturing filters is complex and slow, which keeps costs high for the disposable components such as filters. There is an on-going need for methods and devices for reducing the cost of manufacturing such consumables. The invention provides such a method as described hereon.

SUMMARY OF THE INVENTION

To make filter, the bundles of filter fibers are inserted in a housing and potted at the ends by a complex, many staged process, one of which is described in US Patent Application 2003/0010702.A1 filed Jul. 12, 2001, hereby incorporated by reference as if fully set forth in its entirety herein. Potting material, such as polyurethane, is used to bond the membrane fibers within the dialyzer housing.

As discussed in the application incorporated by reference above, potting material is flowed into a contained space at the end of a filter housing and permitted to harden. This is done either by allowing the potting fluid to settle at the ends of the filter by gravity or by inertia using a centrifuge. While still liquid, the potting material, however, has a tendency to flow into the centers of the filter fibers like water running up a straw in a glass of soda. The liquid seeks the same level inside the fiber as outside. If this happens, after hardening, there will be no plane along which the fiber bundle can be cut to form a header with unplugged fibers.

One of the ways of handling this problem is to pot the ends of the fibers, in situ, using a small amount of potting material at first. These seals the ends of the fibers. Later, more potting material is flowed into place and the result is that the potted ends can be cut above the level of the first phase of potting to reveal open fiber ends, which results in a usable header configuration.

The problem with the two-phase approach is that it requires multiple curing steps, which is undesirable from a production standpoint. Another approach is to melt the ends of the fibers with an iron, but this can burn the material of the fibers and may be difficult to control. Still another is to cut through the fiber bundles using a hot wire or laser. This may seal the ends of the fibers effectively. These alternatives have been found to be slow and inconsistent from a quality standpoint and capital-cost intensive, respectively.

According to an embodiment of the invention, a radiant and/or convection heating process is used. In one embodiment, a hot plate is used as a radiant heater. The hot plate may be moved into position opposite and very close to the ends of the fibers in a bundle and closed in on the face of fibers to maintain a substantially constant distance between the bundle face and the hot plate.

The above approach, by maintaining a narrow separation between a heat source with a substantial radiant component, and the fibers, has been found to provide adequate preparation for potting in a very short time. It has also been found that when the plate is positioned vertically, as is preferred, with the fibers running horizontal and thereby presenting a vertical face of fiber ends to the hot plate, the plate should be angled with respect to the vertical. In particular, a spacing of 7–8 mm at the top and a spacing of 3–4 mm at the bottom, in an exemplary configuration, has been found idea. The difference in spacing is believed to be helpful because of a progressive difference in a degree convective cooling from the bottom of the bundle toward the top. That is, air drawn in by a stack effect between the bundle and the plate is cool at its entry point at the bottom and progressively hotter toward the top. By providing a narrower spacing at the bottom, higher radiant heating compensates for the greater cooling effect at the bottom.

There may be a substantial convective component to the heating in the preferred embodiment, provided by a hot plate, but the radiant component is dominant. In an alternative embodiment, convection may permitted to be more important, for example where the heating flow is at high temperature such that it loses energy quickly rather than transmitting further down toward a center of the fiber bundle.

In a preferred configuration, the spacing between the heat source and the fibers is maintained as the fibers shrink away from the heat source upon melting by a constant speed actuator. The speed and amount of time for the exposure of the fibers may be determined by experiment and calibrated against room temperature, ambient radiant temperatures, and any other suitable variables. Preferably, the production environment is kept constant and no such calibration is used.

One of the benefits of the inventive method is that it speeds production. The amount of time that the fibers need to be exposed to the heater is very short. It follows that the heater needs to be one that can be heated up and cooled quickly or moved toward and away from the fibers before and after they have been melted satisfactorily. In an embodiment of a production application of the inventive method, fast and slow actuators are employed. The fast actuators may be used to move the heaters toward and away from the fibers quickly and the slow actuators to maintain the spacing between the fibers and the heater. These features may be incorporated in an assembly line configuration as discussed with reference to the drawings.

According to an embodiment, the invention provides a method of fabricating a filter. the method begins by positioning a bundle of tube-shaped filters opposite a heat source. A distance between the heat source and the bundle is regulated during heating such that a relative motion between the bundle and heat source is required to maintain a pre-defined non-zero separation distance between the bundle and the heat source while tips of the bundle melt due to heating. This is because the filters melt. Melting causes the ends of the filters to seal. Then liquid is flowed into a receiving space to surround ends of fibers of the bundle and the liquid is hardened to form a plug. Next the plug is cut to form a header. The separation distance may be variable over a period of heating of the bundle or held constant over a period of heating of the bundle. The heat source may be a hot plate. The bundle may be moved relative to the heater after a period of heating of the bundle. Power may be cut to the heat source after the period of heating of the bundle. Preferably, the heat source is a planar radiation source and a spacing of the source is closer at a lower portion thereof than a higher portion thereof to compensate for convective cooling of the fibers.

According to a further embodiment, the invention provides a device for fabricating a filter. The device includes a centrifuge turntable with a fixture for holding a filter fiber bundle and at least one heater movably mounted to be positioned at a first time to irradiate at least one end of the bundle when the turntable is in a first position and to retract away from a heating position at a second time. The centrifuge may be adapted for flowing potting fluid to ends of the filter housing and permitting the fluid to harden. Thus, the function of the application incorporated by reference above may be combined with the filter preparation step in a single apparatus.

Other embodiments of the invention are described below including certain preferred embodiments, with reference to the following illustrative figures so that the invention may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION

Figure 1:
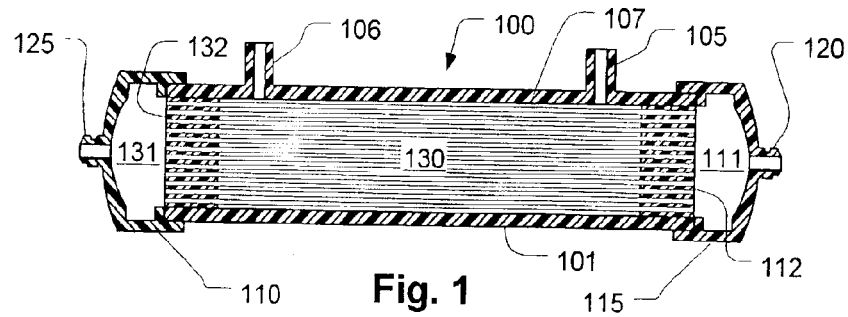
FIG. 1 illustrates a microporous membrane filter showing the components in an assembled condition in section.

Referring now to FIG. 1, a filter 100 has a housing 101 that is generally cylindrical in shape with one or more filtrate ports 105 and 106. In a dialysis application, these filtrate ports 105 and 106 would be connected respectively to a source and drain for dialysate. A bundle of fibers 130 rests within the housing. Each fiber is cylindrical in shape with its interior in communication with header spaces 131 and 111 at respective ends thereof. Respective plugs of potting material 132 and 112 form headers that prevent fluid in the header spaces 131 and 111 from flowing into the internal volume 107 between the fibers which communicates with the filtrate ports 105 and 106. Blood ports 120 and 125 provide access to the header spaces 131 and 111.

Figure 2:
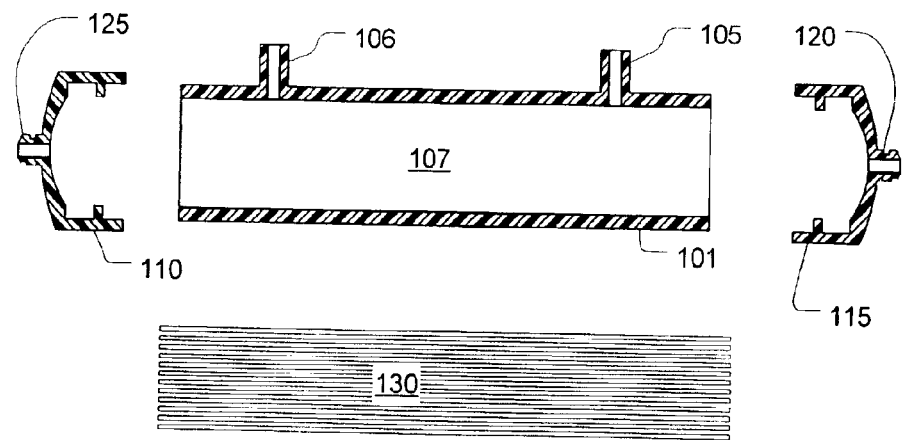
FIG. 2 illustrates the components of the microporous membrane filter of FIG. 1.
Figure 3:
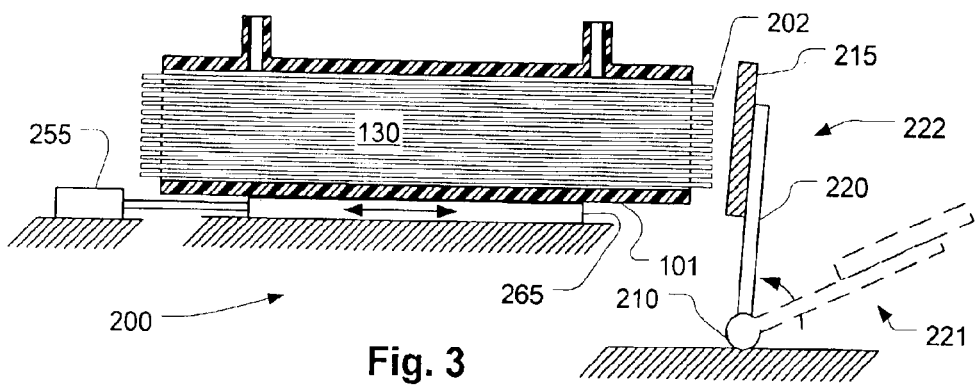
FIG. 3 illustrates a heater and a filter fiber bundle within a filter housing in a configuration for heating the filter fibers during a step prior to potting where the production jig moves the filter housing toward the heater to maintain spacing.

FIG. 2 shows an exploded diagram of the components used for making the filter. The filter tube bundle 130 is inserted loosely into the filter housing 101. Later, end caps 110 and 115 are attached, usually by well-known bonding techniques. The filter tube bundle 130 fills the filter housing and the combination of filter tube bundle 130 and housing 101 are placed on a jig illustrated in FIG. 3, which is used for melting the fiber tips. The jig 200 includes a movable stage 265 that is driven by a precise linear actuator 255 to control the position between a face 202 of the filter bundle 130 and a hot plate 215. The hot plate 215 is brought into a fixed position by a hinged arm support 220 actuated by a suitable motor 210. The motor 210 simply raises and lowers the hot plate 215 between a lowered position shown at 221 in FIG. 3 and a raised heating position shown at 222 in FIG. 2. The linear actuator 255, which may be, for example, a stepper motor drive or servo-controlled motor drive positions the stage 265 to maintain a precisely controlled constant distance between the bundle face 202 and the hot plate 215 by continuously moving the face 202 toward the hot plate 215 as the tips of the bundle face 202 melt and thereby retreat.

Preferably, the plane of the hot plate 215 surface is held at a slight angle relative to the plane of the bundle face 202 such that the spacing is about 3 mm at the bottom and about 7–9 mm at the top. The precise spacing may be adjusted based on the temperature of the hot plate 215, heater ramp time (if any), ambient temperature, and other factors that may affect heat transfer.

It has been determined that melting approximately 5 mm of fiber while maintaining approximately the above spacing of the hot plate 215 can be done in 5–7 seconds. Without continuously adjusting the spacing, the operation takes more time and can result in a less defined boundary between melted and unmelted fiber.

Preferably, the hot plate 215 is maintained at a high temperature and quickly brought into position for heating. In an illustrative embodiment, once the hot plate 215 is in position, the linear actuator 255 may begin moving the stage 265 progressively at a constant rate to produce a traverse of about 5 mm over an interval of 5–7 seconds and then stopped. The hot plate 215 may be immediately withdrawn to a second position illustrated at 221 where the heating effect is substantially halted. These steps may be repeated again and again to treat each end of multiple filter housing 101, fiber bundle 130 combinations.

Figure 4:
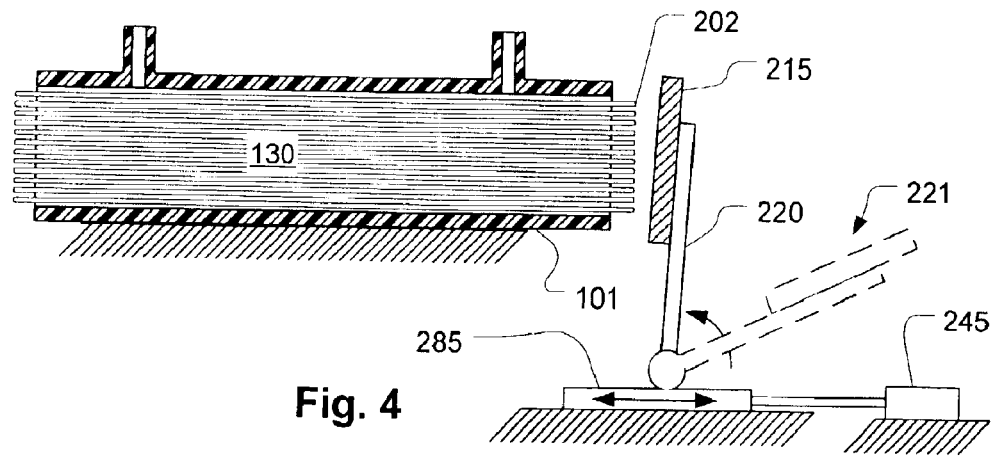
FIG. 4 illustrates a heater and a filter fiber bundle within a filter housing in a configuration for heating the filter fibers during a step prior to potting where the production jig moves the heater toward the filter housing to maintain spacing.

FIG. 4 illustrates an alternative embodiment in which the filter housing 101 is held in a stationary position and the hot plate is moved progressively by a linear actuator toward the fiber bundle face 202 to maintain spacing between the bundle face 202 and the hot plate 215. In this embodiment, the hot plate 215 may be withdrawn to a non-effect position 221 just as in the previous embodiment.

Figure 5:
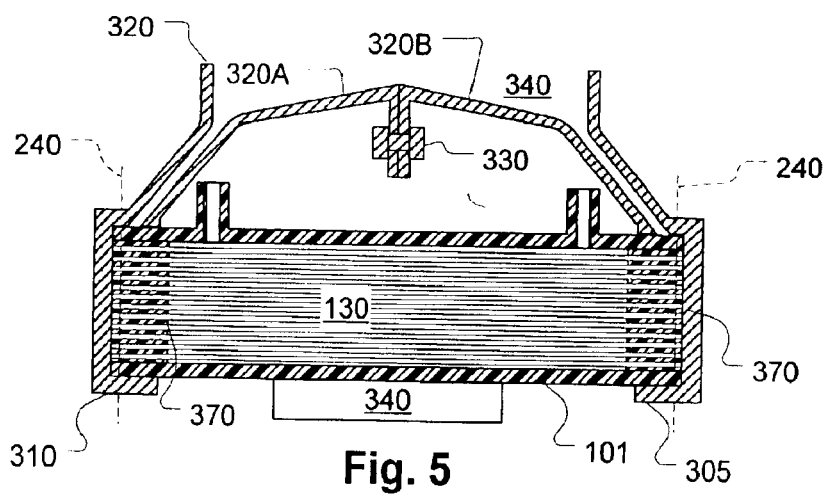
FIG. 5 illustrates a potted fiber bundle and filter housing after melting of fibers and with potting material settled into the ends of the housing.

FIG. 5 illustrates the stage of filter manufacturing that follows the fiber-melting step. After the fibers are melted at their tips, potting material 370 is flowed into the ends of the filter housing 101 and made to harden into plugs. Due to the melting of the fiber ends, no potting material flows into the filter fibers and the hardened material can be cut, along with a portion of the filter housing 101, at planes 240 to provide headers. The caps 120 and 125 (FIG. 1) can then be bonded in place to complete the filter 100 (FIG. 1).

To flow the liquid potting material 370 into the filter housing 101 ends, a system as described in the application incorporated by reference above may be used. Illustrated in FIG. 5 is a variation in which a fixture 320 consisting of two parts 320A and 320B are temporarily clamped around the filter housing 101 by means of a fastener 330 as shown. This forms a well 340 into which liquid potting material is poured. Then the fixture and filter are rotated on a centrifuge stage 240 causing the liquid potting material to settle as shown at 370 and harden. The fixture 320 is one mechanism for flowing the potting material. A preferred embodiment is described in the application incorporated by reference above.

Figure 6:
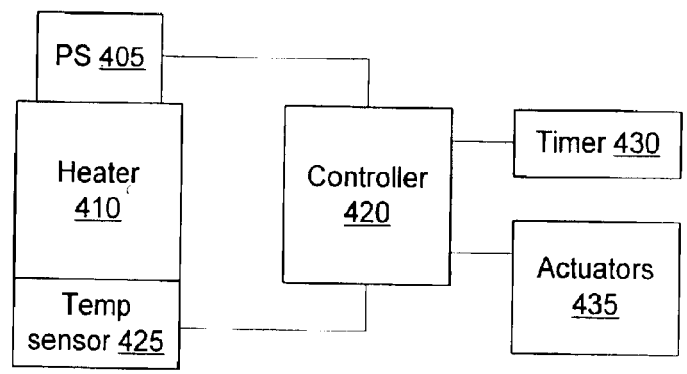
FIG. 6 illustrates a controller for the device of FIG. 4 which uses a timer to control part of the process.

Referring to FIG. 6, a controller for controlling the above process steps is illustrated. A heater 410 in the hot plate 215 is powered by a power supply 405, which is controlled by a controller 420. A temperature sensor 425 may be used to monitor the temperature and used for feedback control, by the controller 420, to maintain required operating temperatures. In an embodiment, the operating temperature is maintained constant. However, the operating temperature may be reduce or power cut off between fiber-melting instances. The controller 420, in the embodiment of FIG. 6, controls the actuators for positioning the hot plate 215 and for controlling the spacing between the fiber bundle face 202 and the hot plate 215. This spacing may be controlled by means of a timer 430 such that the rate of advance is governed to be changed according to a predetermined position-time profile. One position-time profile is a straight line, i.e., a constant speed. Another is a logarithmic one where the rate of closing the spacing starts higher and ends lower. The parameters of such profiles may be determined experimentally according to the particulars of the configuration used.

Figure 7:
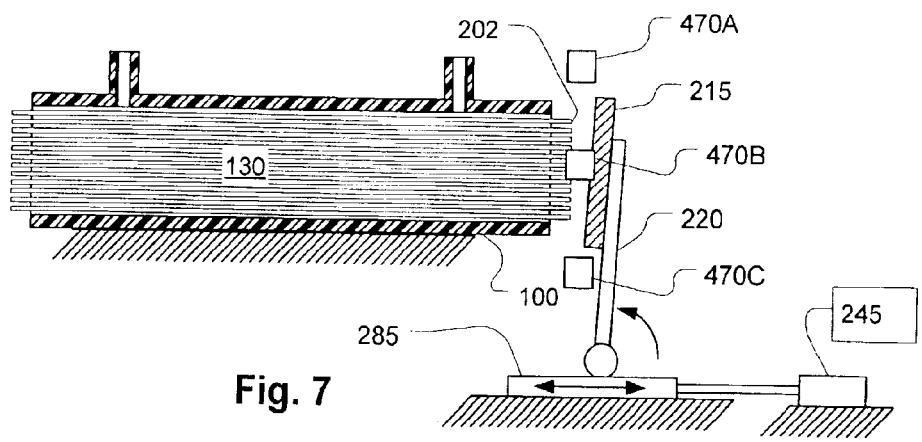
FIG. 7 illustrates a configuration in which a feedback control is used to optimize spacing between the fiber bundle and the heater.
Figure 8:
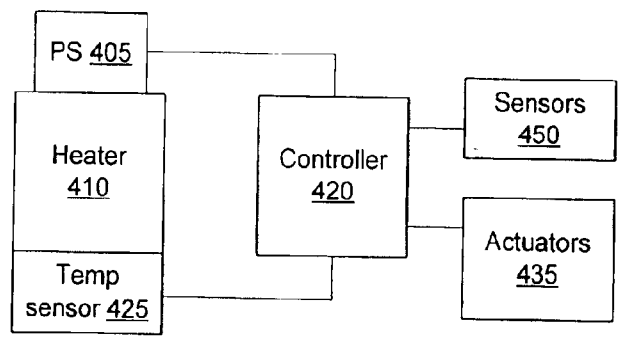
FIG. 8 illustrates a control system that corresponds to the embodiment of FIG. 7.

Referring now to FIG. 7, an embodiment similar to that of FIG. 4 is shown. In the embodiment of FIG. 7, sensors 470A, 470B, and 470C are used to determine the spacing between the fiber bundle face 202 and the hot plate 215. The sensors may be optical sensors such as low resolution imagers. Alternatively, they may be infrared receivers that are aimed to view the hot face 202 of the melting fibers (or a sampling thereof) and control the spacing responsively to the detected temperature. Such are alternatives to controlling the spacing based on time. FIG. 8 illustrates a control system with similar components as those of the embodiment of FIG. 6 except that instead of a timer 430, sensors 450 provide signals to the controller 420 to control the spacing. By controlling the spacing dynamically using feedback control, calibration steps may be avoided and changing ambient conditions can be compensated for.

Figure 9:
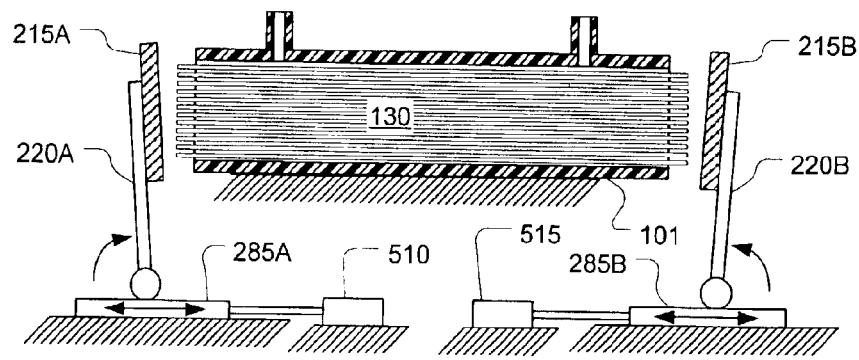
FIGS. 9 and 10 illustrate a configuration for melting fibers at both ends of a housing at same time with heaters applied and withdrawn respectively.
Figure 10:
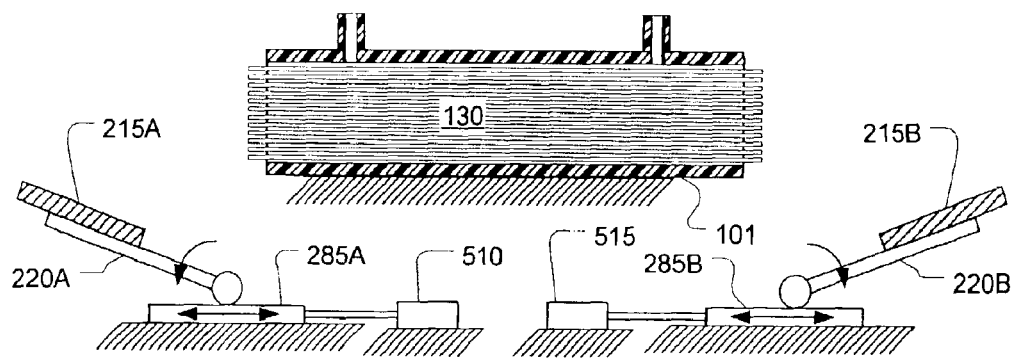
Figure 11:
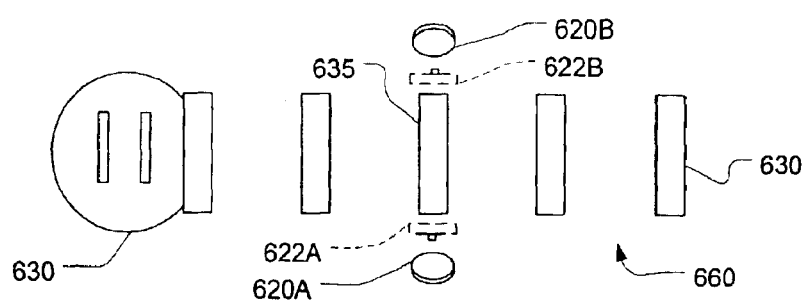
FIGS. 11 and 12 illustrate two production setups, a first in which filter fibers are melted along an assembly line that delivers melted fibers and housings to one or more potting jigs and a second in which filter fibers are melted on the stage of a centrifuge adapted to carry the heaters for melting.

Referring to FIGS. 9 and 10, a configuration providing for simultaneous melting of fibers on both ends of a filter housing is illustrated. Here, two hot plates 215A and 215B with associated supports 220A and 220B move the hot plates 215A ad 215B into position and control the spacing at each end by means of respective linear actuators 510 and 515 moving respective stages 285A and 285B. FIG. 9 shows the apparatus in a configuration used for melting the fibers and FIG. 10 shows the same embodiment in a configuration for standing by, either in preparation for melting or after melting. The configuration of FIGS. 9 and 10 may be used in an assembly-line 660 production setting as illustrated in FIG. 11, where filter housing with bundles within, shown at 630 are consecutively moved into position between opposing heaters 622B and 622A. The heaters 622B and 622A may be left in a fixed position with the filter housing/bundle combinations 630 being swiftly brought into place or they may be withdrawn to waiting positions illustrated at 620B and 622A and then moved into a heating position as discussed with reference to FIGS. 9 and 10. Illustrated at 630 is a centrifuge station for flowing the potting material into place. One or more such stations may be fed by a single line 660 using known techniques for production lines.

Figure 12:
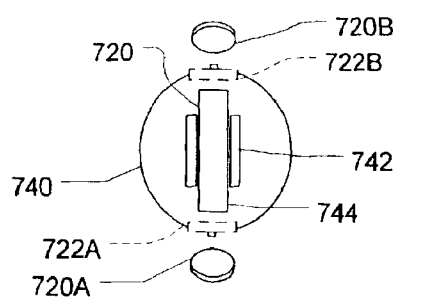

Referring to FIG. 12, another production apparatus provides for the placement of one or more heaters, exemplified by two heaters 722A and 722B at a centrifuge 740. When a filter housing 744 with filter bundle is placed in a fixture 742 on the centrifuge table 740, the turntable 740 may be rotated into position with the filter ends facing the one or more heaters 722A/B. The turntable 740 may be under automated control and thereby used to position the filter housing 744 with fibers for heating and then to withdraw them by rotating the turntable. Thus, the function of the actuator mechanism 210 of FIG. 3 and similar devices illustrated in other figures and discussed below may be provided by the turntable 740. Note that a single heater 722B may be used alone and the filter housing 744 combination rotated into position twice for melting the fibers before proceeding to the potting step.

Note that although various kinds of movement mechanisms are illustrated in the above embodiments, it is clear that many different types could be substituted therefore. For example, linear actuators may be substituted for rotary and vice versa. In particular, for example, a single rotary actuator may perform the functions of drives 210 and 255 in FIG. 3 by providing a fast withdrawal motion (provided by drive 210) and a slow precise melting-compensation motion (provided by drive 255). The amount of change of the angle of the heater face and that of the fiber bundle face 202 during the melting-compensation motion can be adjusted by means of the lever arm, although some may be accommodated. Also, a single linear drive may be employed to the same combined affect.

Figure 13:
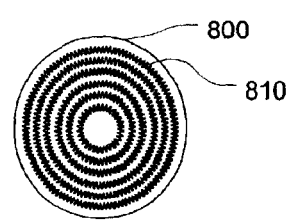
FIG. 13 depicts an alternative heater.

Referring to FIG. 13, note that although in the above embodiments, a hot plate 215 is used, other types of heat sources may be employed such as a heater 800 with a rapidly-heating filament 810 with low thermal inertia. With such a heater, it may be possible to operate the configurations of FIGS. 3, 4, 7, 9, 10 and 11 without moving the heater (in those cases, hot plate 215) toward and away from the fiber face 202, but rather power up and power down the filament 810 to start and stop the heating process. A combination of the above may be done as well since the filament may provide power saving in the above embodiments when the heater is withdrawn.

Although the foregoing invention has, for the purposes of clarity and understanding, been described in some detail by way of illustration and example, it will be obvious that certain changes and modifications may be practiced which will still fall within the scope of the appended claims. For example, it will be understood that any feature of any device or method disclosed herein can be used with any of the other devices or methods, even though any given figure might depict only a particular combination.

What is claimed is:

1. A method of fabricating a filter, comprising the steps of:
positioning a bundle of tube-shaped filters opposite a heat source;
regulating a distance between said heat source and said bundle such that a relative motion therebetweeen is required to maintain a predefined non-zero separation distance between said bundle and said heat source while tips of said bundle melt due to heating;
causing a liquid to flow into a receiving space to surround ends of fibers of said bundle;
hardening said liquid to form a plug;
cutting said plug to form a header.

2. A method as in claim 1, wherein said separation distance is variable over a period of heating of said bundle.

3. A method as in claim 1, wherein said separation distance is constant over a period of heating of said bundle.

4. A method as in claim 1, wherein said heat source is a hot plate.

5. A method as in claim 1, further comprising moving said bundle and said heater apart after a period of heating of said bundle.

6. A method as in claim 1, further comprising cutting power to said heat source after a period of heating of said bundle.

7. A method as in claim 6, wherein said separation distance is variable over a period of heating of said bundle.

8. A method as in claim 6, wherein said separation distance is constant over a period of heating of said bundle.

9. A method as in claim 6, wherein said heat source is a hot plate.

10. A method as in claim 6, further comprising moving said bundle and said heater apart after a period of heating of said bundle.

11. A method as in claim 1, wherein said heat source is configured such that a majority of heat is transferred to said bundle by radiation.

12. A method as in claim 11, wherein said heat source is a planar radiation source and a spacing of said source is closer at a lower portion thereof than a higher portion thereof to compensate for convective cooling of said fibers.

13. A method as in claim 12, wherein said heat source is a hot plate.

14. A method as in claim 1, wherein said heat source is a planar radiation source and a spacing of said source is closer at a lower portion thereof than a higher portion thereof to compensate for convective cooling of said fibers.

15. A method as in claim 14, wherein said heat source includes a hot plate.

16. A device for fabricating a filter, comprising:
a centrifuge turntable with a fixture for holding a filter fiber bundle;
at least one heater movably mounted to be positioned at a first time to irradiate at least one end of said bundle when said turntable is in a first position and to retract away from a heating position at a second time;
said centrifuge being adapted for flowing potting fluid to ends of said filter housing and permitting said fluid to harden.

17. A device as in claim 16, further comprising a controller configured to position said end of said bundle opposite said heater at said first time and to rotate to move said end of said bundle at said second time.

18. A device as in claim 16, wherein said heater is configured such that a majority of heating effect is provided by radiation.

19. A device as in claim 16, wherein said at least one heater includes a hot plate.

20. A method as in claim 16, wherein said at least one heater is a planar radiation source and a spacing of said source is closer at a lower portion thereof than a higher portion thereof to compensate for convective cooling of said fibers.

21. A device as in claim 20, wherein said at least one heater includes a hot plate.

22. A method of fabricating a filter, comprising the steps of:
positioning a bundle of tube-shaped filters opposite a planar heat source held offset from said bundle such that a lower portion thereof is slightly closer to said bundle than an upper portion thereof;
said heat source having a spacing from said bundle and a temperature such that a heating of said fibers is effective to melt said fibers by means of radiation.

23. A method as in claim 22, further comprising regulating a distance between said heat source and said bundle such that a relative motion therebetweeen is required to maintain a predefined non-zero separation distance between said bundle and said heat source while tips of said bundle melt due to heating and wherein a separation distance between said bundle and said heat source is variable over a period of heating of said bundle.

24. A method as in claim 22, wherein said heat source is a hot plate.

25. A method as in claim 22, further comprising moving said bundle and said heater apart after a period of heating of said bundle.

26. A method as in claim 22, further comprising cutting power to said heat source after a period of heating of said bundle.

27. A method of fabricating a filter that contains parallel tubular filter fibers that receive fluid at their ends which is filtered by the walls of said tubular filter fibers, in which fluid is distributed by a first header of the filter and collected by a second header, each header being located at a respective end of said tubular filter fibers, comprising the steps of:
positioning a bundle of said tubular filter fibers opposite a heat source such that said heat source is near at least one of said ends of said tubular filter fibers;
after said step of positioning, irradiating the ends of said tubular filter fibers to melt them and thereby seal them with said heat source without contacting said heat source with said tubular filter fibers;
distributing potting material to the ends of the tubular filter fibers after said step of irradiating such that said potting material is prevented from entering said tubular filter fibers by a result of said step of irradiating and consequent sealing;
hardening said potting material to form a plug;
cutting said plug to form at least one of said headers.

28. A method as in claim 27, wherein said step of irradiating includes regulating a distance between said heat source and said tubular filter fibers to maintain a specified non-zero distance between said tubular filter fibers and said heat source.

29. A method as in claim 27, wherein said heat source is a planar heating element which is, during said step of irradiating, placed substantially parallel to a planar face defined by ends of said tubular filter fibers.

30. A method as in claim 29, wherein an orientation of said planar heat source is slightly closer at a lower portion thereof to compensate for greater convective heating at an upper portion thereof.

* * * * *